UNITED STATES PATENT OFFICE.

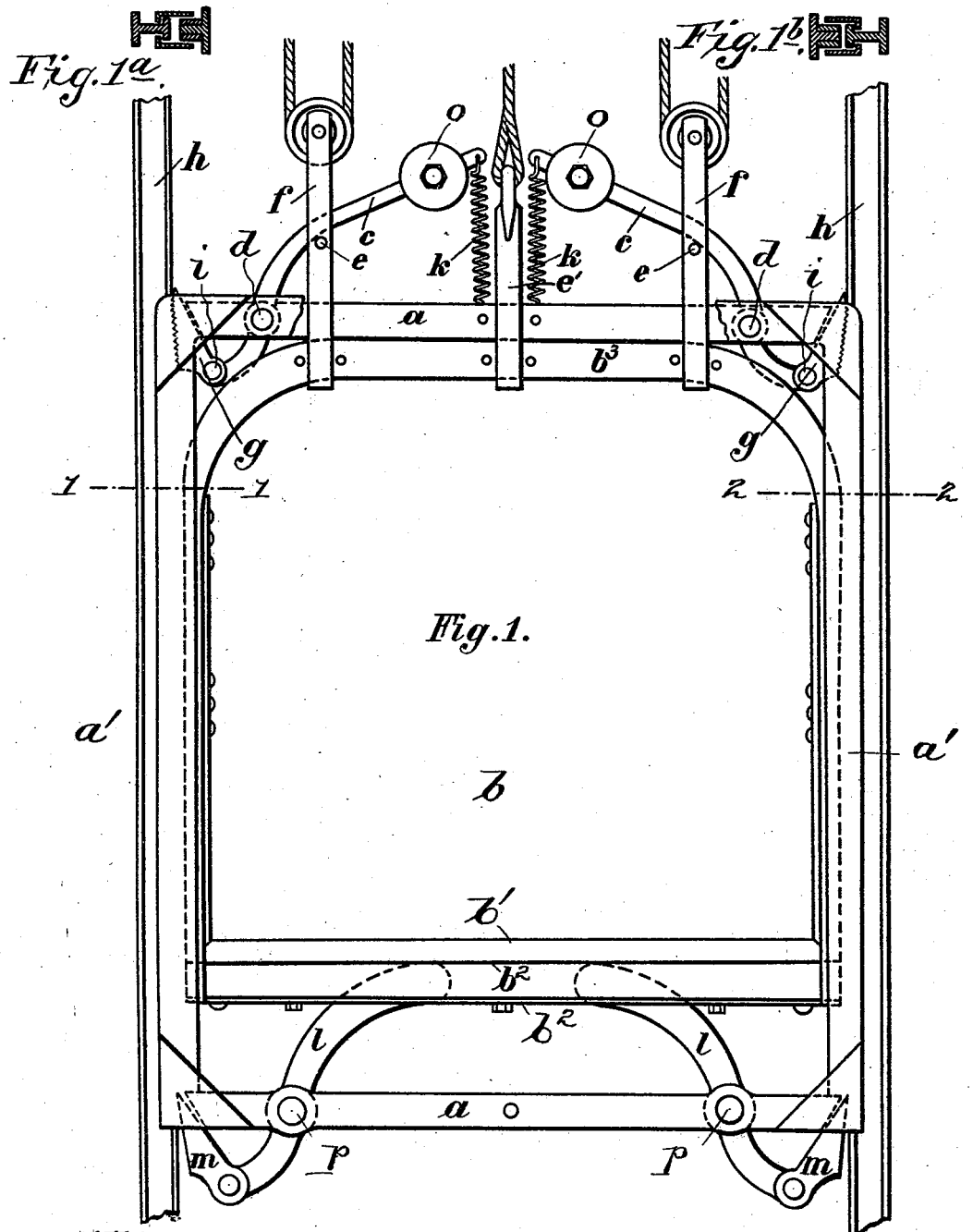

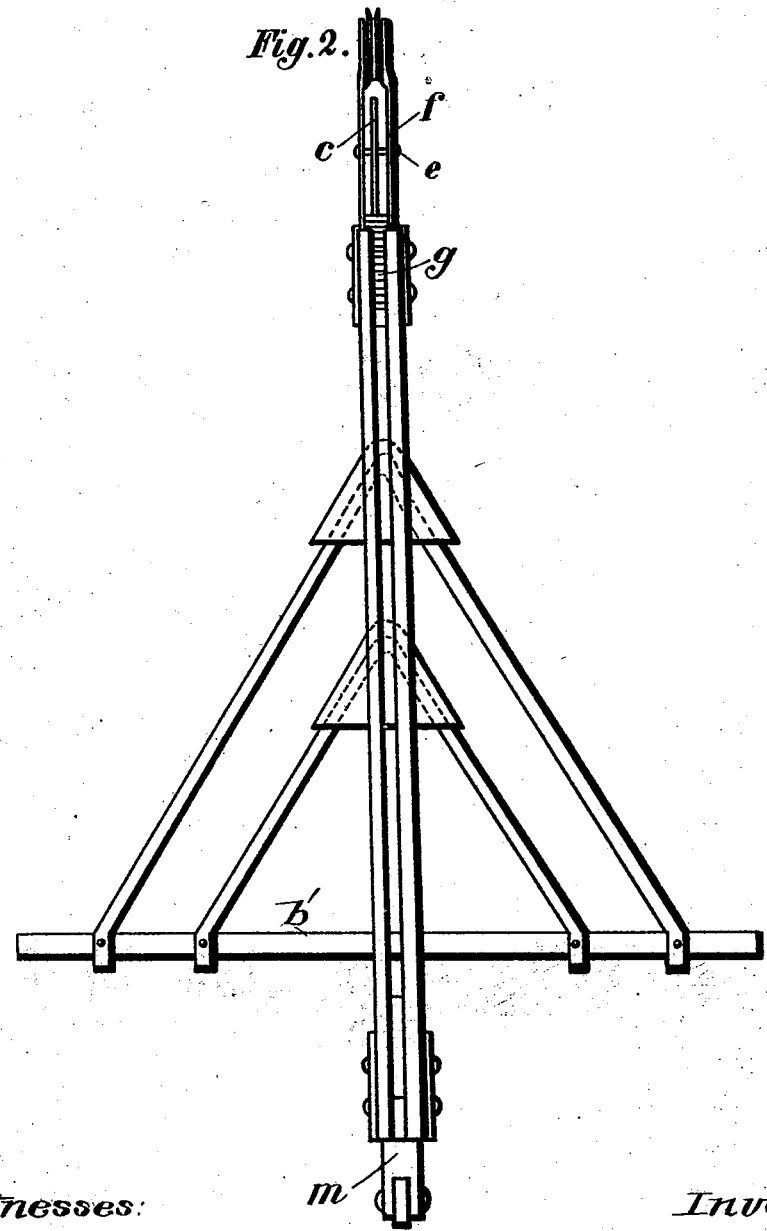

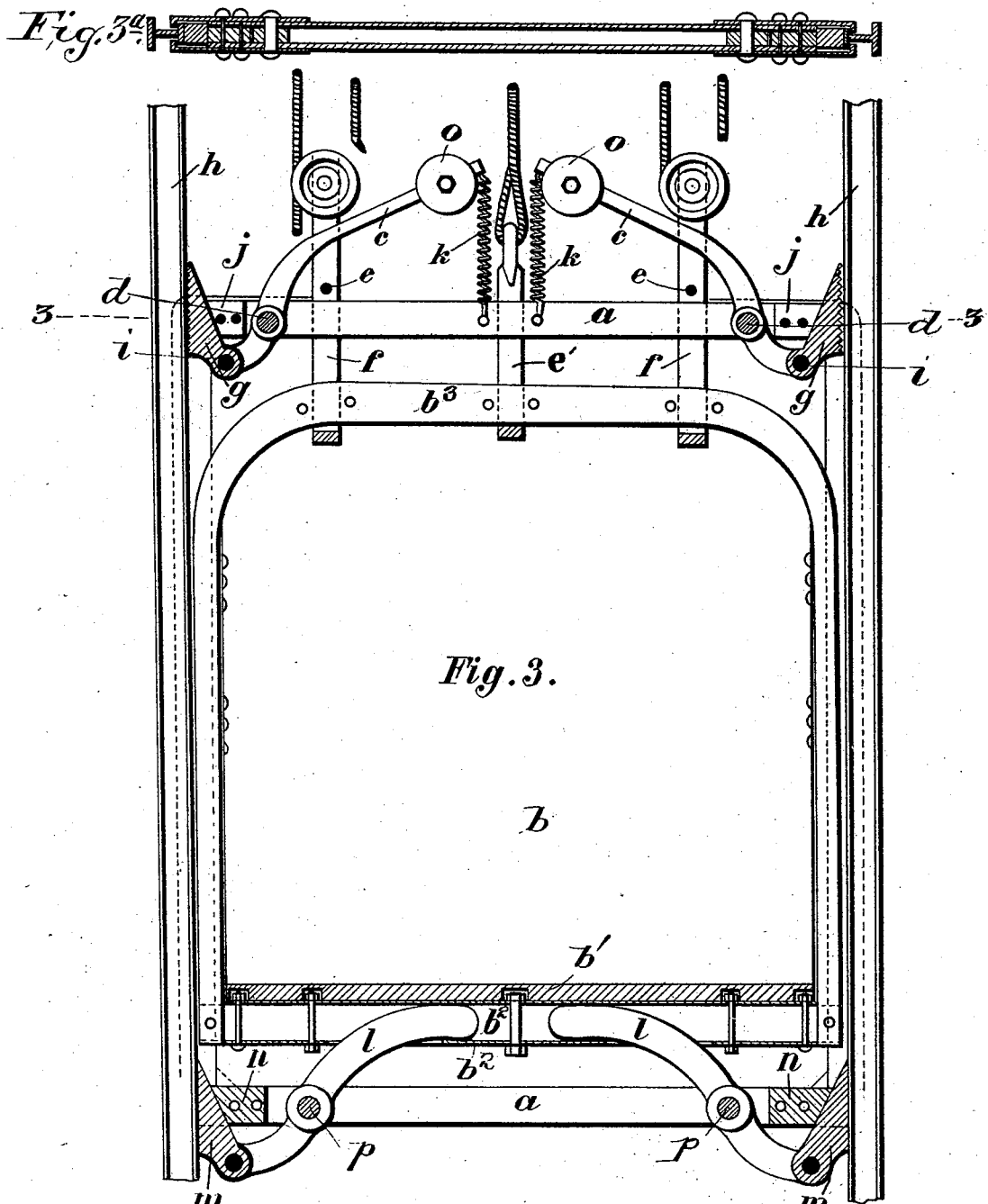

GEORG WILHELM LUDOVICI, OF CASSEL, GERMANY.

SELF-ACTING BRAKE FOR ELEVATORS.

SPECIFICATION forming part of Letters Patent No. 517,755, dated April 3, 1894.

Application filed August 14, 1893. Serial No. 483,090. (No model.)

*To all whom it may concern:*

Be it known that I, GEORG WILHELM LUDOVICI, of Cassel, in the Empire of Germany, have invented new and useful Improvements in Self-Acting Brakes for Elevators, of which the following is a specification, reference being had therein to the accompanying drawings.

The object of my invention is to fit elevators with improved safety brakes to arrest the movement of the cage in case of the breakage of the lifting rope or cable. And in order that my said invention may be particularly described and ascertained, reference is hereby made to the accompanying drawings, in which similar letters of reference indicate corresponding parts.

Figure 1 is an elevation of an elevator fitted with my improvements, the ropes being shown intact, and the brakes out of action. Figs. 1$^a$ and 1$^b$ represent cross sections through the guides, cage irons and brake frame, on lines 1—1 and 2—2 respectively of Fig. 1. Fig. 2 is a side view of Fig. 1. Fig. 3 is an elevation, partly in section, showing the brakes in operation. Fig. 3$^a$ represents a transverse section on line 3—3 of Fig. 3.

In the drawings $b$ represents the elevator cage having a platform $b'$. Surrounding the cage $b$ is a rectangular frame $a$ having guiding portions $a'$ for engaging the vertical guide rails $h\ h$ and the cage $b$ is constructed so as to move vertically with respect to said frame $a$, and be guided by the vertical guiding portions $a'$. The brake mechanisms are fitted to the frame $a$ above and below the cage $b$ and are adapted to be instantly forced into operation by the downward movement of the cage in the frame $a$.

The upper brake mechanism comprises two levers $c\ c$, pivoted to the frame $a$ at $d\ d$. $g\ g$ are two wedge shaped brake blocks, with serrated contact surfaces, pivoted at $i\ i$ to the short arms of the levers $c\ c$. $o\ o$ are weights fitted to the long arms of the levers $c\ c$. $k\ k$ are springs, one end of each spring being attached to the frame $a$, and the other end to the lever $c$, as shown. The object of the weight $o$ and spring $k$ is to render the operation of the brake certain so that, in case the spring $k$ should fail, the weight would cause the lever to apply the brake. In ordinary cases however the springs $k$ and weights $o$ operate together. $j\ j$ are stationary cams secured to the frame $a$ and provided with inclined surfaces which hold the brake blocks $g$ in position pressing them against the guide rails $h\ h$, when raised by the short arms of the levers $c\ c$.

The lower brake comprises two levers $l\ l$ pivoted to the frame $a$ at $p\ p$. $m\ m$ are two wedge shaped brake blocks pivoted at $s\ s$ to the short arms of the levers $l\ l$. $n\ n$ are stationary cams secured to the frame $a$ and provided with inclined faces to hold the brake blocks in position, when raised by the short arms of the levers $l\ l$. The long arms of the levers $l\ l$ are in contact above and below with portions of the frame work of the cage $b$, in this instance plates $b^2 b^2$ under the floor of the cage.

The cage is sustained by two forked straps $f\ f$ through which the levers $c\ c$ pass. $e\ e$ are two pins secured to the straps $f\ f$ which lift the levers $c$ when the cage is sustained by the straps $f\ f$. Each strap carries a loose pulley at its upper end for receiving the rope.

In the drawings I have shown a third rope engaging a strap $e'$ secured to the central portion of the bar $b^3$ of the cage. This rope is secured to a suitable counter balance weight, not shown, as is usual in elevators.

The operation is as follows: When the cage is sustained by the ropes or cords, as shown in Fig. 1, the upper cross bar $b^3$ of the frame work of the cage $b$ is raised into contact with the upper part of the frame $a$. The pins $e\ e$ lift the long arms of the levers $c\ c$, and thereby withdraw the brake blocks $g\ g$ from contact with the guide rails $h\ h$. In like manner the raising of the plates $b^2$ of the cage $b$ in the frame $a$, lifts the long arms of the levers $l\ l$ of the lower brakes, the brake blocks $m\ m$ being thereby withdrawn from contact with the guide rails $h\ h$. The cage is thus free to be raised or lowered. On the breaking of one or more rope or ropes, as shown in Fig. 3, or the sudden fall of the cage, the supports $f\ f$ are released and the cage will instantly fall with respect to the frame $a$. The long arms of the levers $c\ c$ and $l\ l$ are then depressed by the weights $o\ o$, springs $h$ and the lowering of the plates $b^2\ b^2$ of the cage, whereby the wedges $g\ g$ and $m\ m$ are jammed between the cams *j* and and *n* and the guide rails *h h*, thus arresting the motion of the cage immediately. Should the cage be again raised, all the wedges are immediately released and the cage is free to move.

What I claim, and desire to secure by Letters Patent of the United States, is—

1. In an elevator the combination with the cage, of an independently movable frame, normally supported thereby, movable brake blocks secured to said frame, stationary cams secured to said frame in position to be engaged by said brake blocks, devices connected with the cage for normally holding said brake blocks out of operation, and means for forcing said blocks into engagement with the said cams to apply the brakes, on the downward movement of said cage in respect to said frame, substantially as described.

2. In an elevator the combination with the vertical guide rails and the movable cage, of an independently movable frame, normally supported by said cage, and provided with movable brake blocks for engaging said rails, cams secured to said frame in position to be engaged by said blocks, devices connected with the cage for normally holding said blocks out of engagement with cams, and devices connected with said blocks for throwing them into engagement with said cams, and guide rails, on the downward movement of the cage with respect to said frame, substantially as described.

3. In an elevator the combination with the guide rails, and the movable cage, of an independently movable frame, normally supported by said cage, and provided with movable wedge shaped brake blocks for engaging said rails, stationary cams secured to said frame in position to engage said blocks, devices connected with said cage for normally holding said blocks out of operation and devices for throwing said wedge shaped blocks into engagement with said cams and guide rails on the downward movement of the cage, with respect to said frame, substantially as described.

4. In an elevator the combination with the guide rails, and movable cage, of an independently movable frame, normally supported by said cage, and provided with wedge shaped brake blocks, pivoted levers connected with said brake blocks, and provided with springs for throwing said blocks into operation, stationary cams secured to said frame in position to be engaged by said blocks and devices connected with the cage for engaging said levers and normally holding said brake blocks out of operation, substantially as described.

5. In an elevator the combination with the guide rails and movable cage, of an independently movable frame normally supported by said cage, provided with two pairs of brake blocks, one pair being provided with springs for throwing them into engagement with the rails, and the other being operatively connected with said cage, and devices connected with the cage for normally holding said spring actuated brake blocks out of engagement with said rails, whereby the downward movement of the cage with respect to said frame will force one pair of brake blocks directly into operation and release said spring actuated brake blocks, substantially as described.

In witness whereof I have hereunto set my hand in presence of two witnesses.

GEORG WILHELM LUDOVICI.

Witnesses:
RUDOLF SEIDEL,
CARL BRÜCHNER.